United States Patent
Ayres

(10) Patent No.: US 9,371,971 B2
(45) Date of Patent: Jun. 21, 2016

(54) FLASHLIGHT INSERT FOR AN OIL-TYPE LIGHTER

(71) Applicant: John Alfred Ayres, Lapeer, MI (US)

(72) Inventor: John Alfred Ayres, Lapeer, MI (US)

(*) Notice: Subject to any disclaimer, the term of this patent is extended or adjusted under 35 U.S.C. 154(b) by 0 days.

(21) Appl. No.: 14/154,181

(22) Filed: Jan. 14, 2014

(65) Prior Publication Data

US 2015/0198297 A1    Jul. 16, 2015

Related U.S. Application Data

(63) Continuation-in-part of application No. 12/180,532, filed on Jul. 26, 2008, now abandoned.

(60) Provisional application No. 60/962,466, filed on Jul. 30, 2007.

(51) Int. Cl.
| | |
|---|---|
| F21L 4/04 | (2006.01) |
| F21L 4/02 | (2006.01) |
| F21V 23/04 | (2006.01) |
| F21V 33/00 | (2006.01) |
| F21Y 101/02 | (2006.01) |
| F21V 1/00 | (2006.01) |
| F23Q 2/36 | (2006.01) |

(52) U.S. Cl.
CPC .............. *F21L 4/027* (2013.01); *F21V 23/0414* (2013.01); *F21V 33/00* (2013.01); *F21V 33/0004* (2013.01); *F21L 2001/00* (2013.01); *F21Y 2101/02* (2013.01); *F23Q 2/36* (2013.01); *Y10T 29/49002* (2015.01)

(58) Field of Classification Search
CPC .............................. F23Q 2/34; F21V 23/0414
USPC ........................................................ 362/200
See application file for complete search history.

(56) References Cited

U.S. PATENT DOCUMENTS

| | | | | |
|---|---|---|---|---|
| 2,066,028 | A * | 12/1936 | Britsch | 362/109 |
| 2,249,692 | A * | 7/1941 | Gelardin | 362/200 |
| 2,867,753 | A * | 1/1959 | Quandt | 431/132 |
| 4,816,971 | A * | 3/1989 | Chin | 362/200 |
| 5,235,157 | A * | 8/1993 | Blackburn | 219/268 |
| 5,359,505 | A * | 10/1994 | Story et al. | 362/200 |
| 5,424,929 | A * | 6/1995 | Murray et al. | 362/200 |
| 6,520,658 | B2 * | 2/2003 | Chen | 362/84 |
| 7,704,071 | B2 * | 4/2010 | Liu et al. | 431/253 |
| 9,157,628 | B2 * | 10/2015 | Gebhard | F23Q 7/00 |

(Continued)

OTHER PUBLICATIONS

Kipkay, "Zippo LED Flashlight!", Sep. 6, 2011, youtube.com, https://www.youtube.com/watch?v=cakYpP2escc.*

*Primary Examiner* — Evan Dzierzynski
*Assistant Examiner* — Matthew Peerce

(57) ABSTRACT

This invention is a removable flashlight insert for fitting into an oil-type cigarette lighter outer case. The flashlight insert contains an LED lamp module with a movable switch element and a battery module contained within a top chamber and a bottom chamber respectively of an outside metal shell. The outside metal shell provides a direct conduction path between a battery terminal in the bottom chamber and the movable switch element in the top chamber. The flashlight insert may contain two different LEDs, where either of the two LEDs may be user selected by a separate switch. A rechargeable flashlight insert is also shown having an electronic circuit contained inside the outer metal shell. Lamp and battery modules are also provided in a kit to transform an oil-type cigarette lighter insert into a flashlight insert.

23 Claims, 15 Drawing Sheets

(56) References Cited

U.S. PATENT DOCUMENTS

2002/0064042 A1* 5/2002 Leslie ............................ 362/191
2005/0231941 A1* 10/2005 Huang ........................... 362/208

* cited by examiner

View I

View II

View III

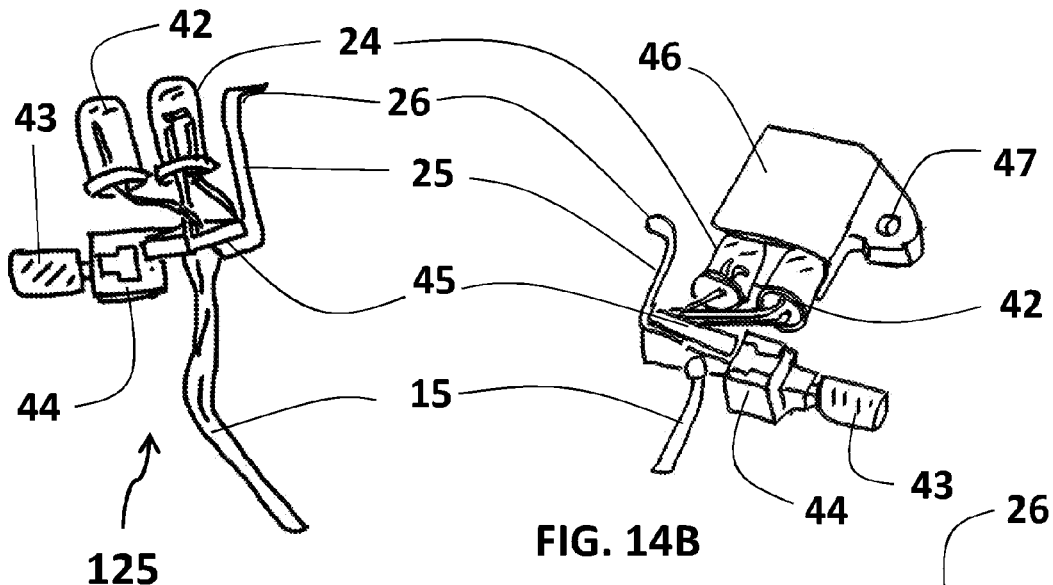
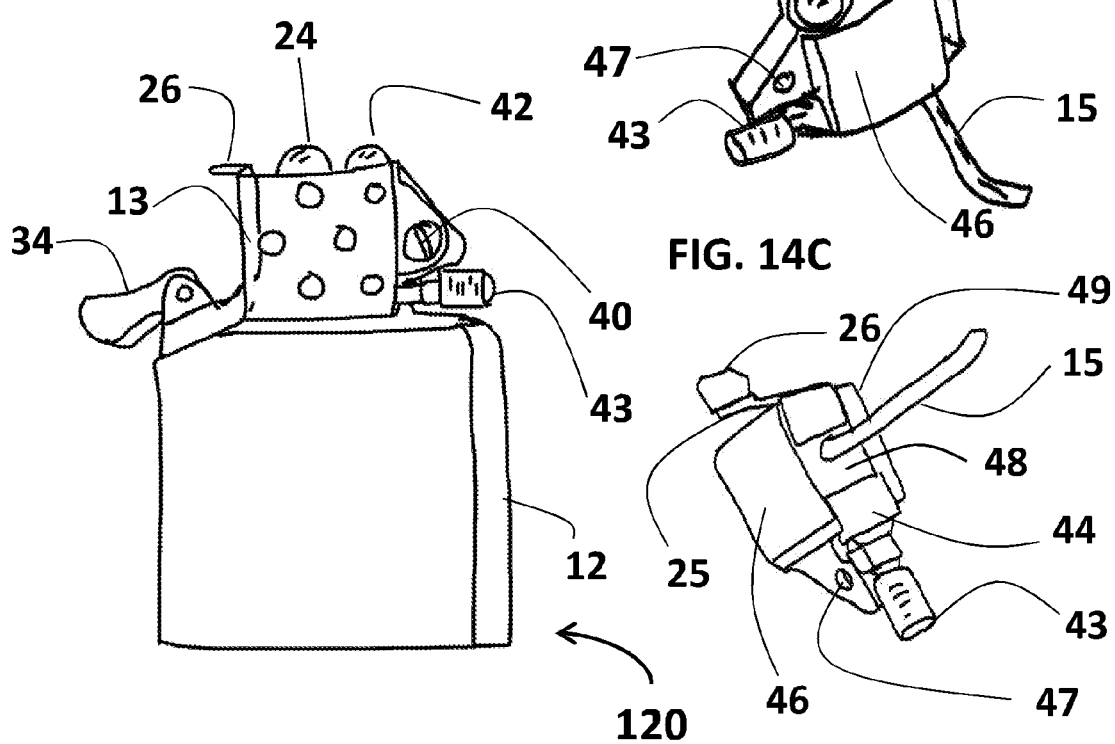

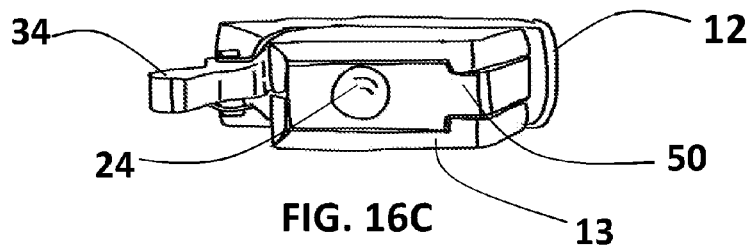
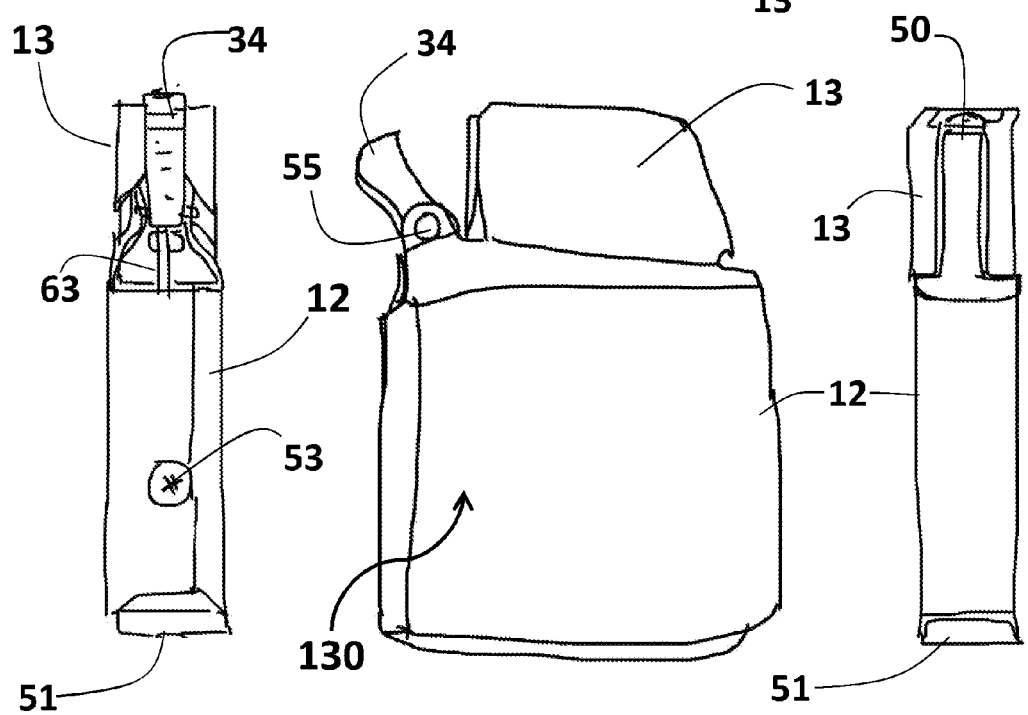
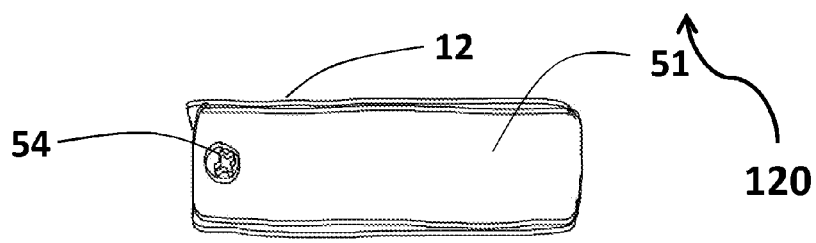
FIG. 16C
FIG. 16B    FIG. 16A    FIG. 16D
FIG. 16E

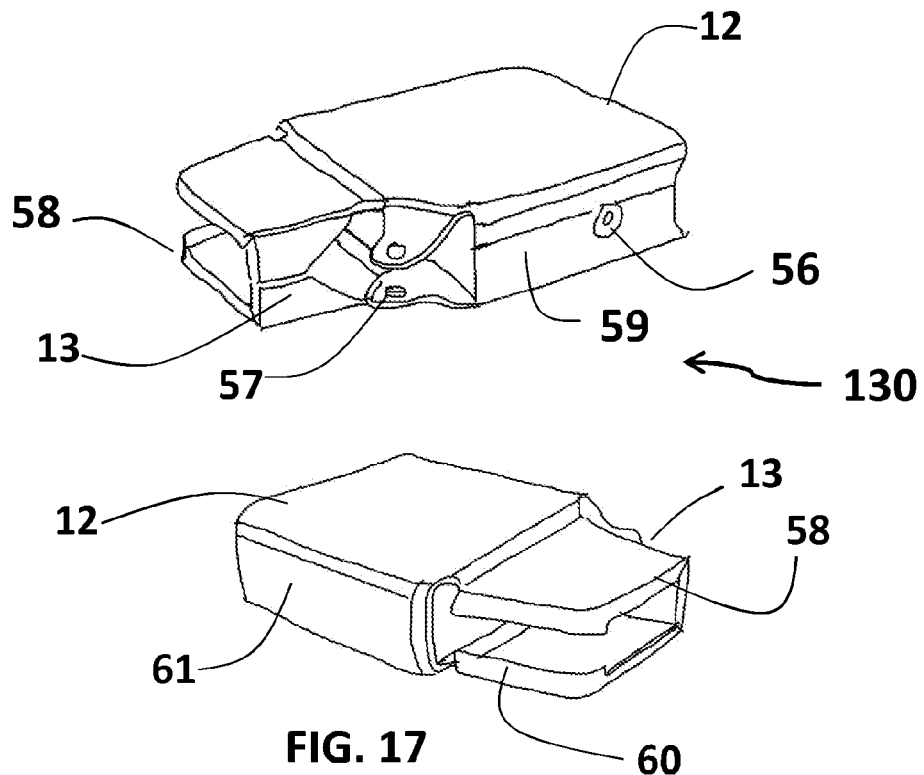
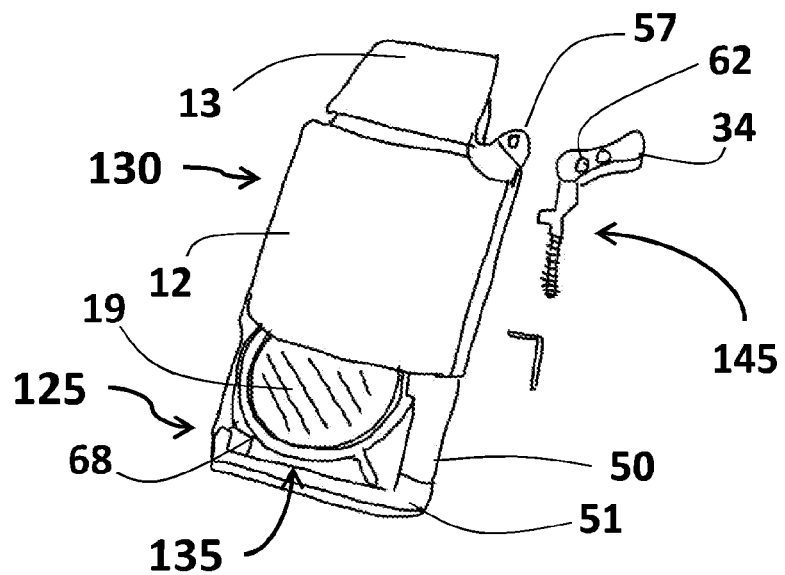
FIG. 17
FIG. 18

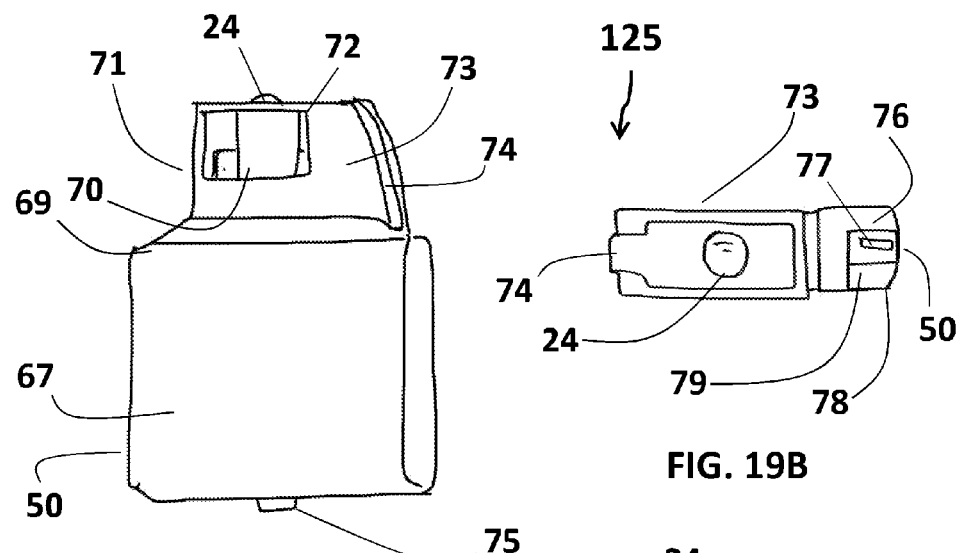
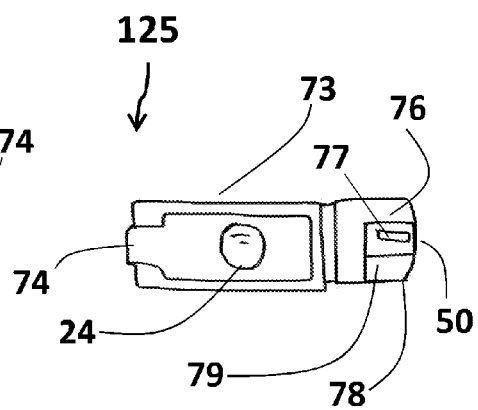
FIG. 19B
FIG. 19C
FIG. 19D
FIG. 19A

FLASHLIGHT INSERT FOR AN OIL-TYPE LIGHTER

This patent application is a continuation-in-part of application Ser. No. 12/180,532 filed on Jul. 26, 2008 which is the non-provisional application of provisional application 60/962,466 filed on Jul. 30, 2007.

BACKGROUND ART

1. Field of the Invention

This invention relates to lamps, flashlights, and signal lights and particularly to a flashlight insert designed to fit into an oil-type cigarette lighter outer case.

2. Description of the Related Art

A flashlight insert for use in a cigarette lighter outer case is shown in Zippo (a registered trademark of The Zippo Manufacturing Company) U.S. Pat. Nos. 5,359,505 and 5,424,929. In both patents, a flashlight is created by replacing the oil-type cigarette lighter insert sub-assembly by a battery powered lighting module. FIG. 1 shows a cross section view of prior art U.S. Pat. No. 5,359,505. The cigarette lighter outer case 2 is shown with a lid 1 and encloses a plastic flashlight insert 3. The flashlight insert 3 contains batteries 4, lamp bulb 5, and switch 6. Flat conducting strips 8 and 9 connect batteries 4 to lamp 5. Flat conductor 10 connects one battery terminal to the lighter outer case 2. Switch 6 is a plastic button attached to a flexible flat conductor 7. Conductor 7 makes contact with the lighter outer case 2 when lid 1 is open, thus connecting the batteries together through the metal lighter outer case and completing the circuit to turn on lamp 5. When lid 1 is closed, it engages plastic button 6 and forces the conductor 7 away from the lighter outer case 2, opening the circuit and turning off lamp 5. Thus it can be seen that this flashlight insert relies on the electrical conductivity of the inside surface of a cigarette lighter outer case to complete the circuit to turn on the flashlight. It has been observed that some cigarette lighter outer cases are painted for decorative purposes, and that paint can get to the inside surface of the outer case causing electrical connection problems with the flashlight insert. In addition, foreign material and dirt can collect on the inside surface of the lighter case causing electrical connection problems. Prior art U.S. Pat. No. 5,424,929 was established by Zippo to overcome certain issues like those above. It does not rely on a cigarette lighter outer case for a conduction path, but uses a cigarette lighter outer case to enable conduction within a flashlight insert. However, both of the above patents of the prior art rely on a plastic electrically insulated outer shell to house all of the internal conductor strips of the flashlight insert in order to prevent short-circuits between conductor strips and between certain conductor strips and the cigarette lighter outer case. The invention here within provides solutions to all problems within the prior art while providing for a low cost flashlight insert for oil-type cigarette lighters. The oil-type lighter terminology as used herein refers to a Zippo type oil lighter construction as disclosed in Zippo U.S. Pat. No. 2,032,695, which is taken herein, in its entirety, as a reference.

SUMMARY OF THE INVENTION

It is therefore an object of the present invention to utilize an outside metal shell in a flashlight insert for insertion into an oil-type cigarette lighter outer case.

It is a further object of the present invention to provide a lamp module containing a movable switch element and one or more light sources within an outside metal shell of a flashlight insert for insertion into an oil-type cigarette lighter outer case.

It is a still further object of the present invention to provide a removable battery module within an outside metal shell of a flashlight insert for insertion into an oil-type cigarette lighter outer case.

It is a still further object of the present invention to provide an electrical switching means within an outside metal shell of a flashlight insert, where switching means is activated by motion of a lid attached to an oil-type cigarette lighter outer case.

It is a still further object of the present invention to connect a movable switch element in a lamp module to a battery terminal in a battery module by means of an electrically conducting path, where such conducting path is an outer metal shell of a flashlight insert for use in an oil-type cigarette lighter outer case.

It is a still further object of the present invention to utilize a spark from a spark wheel and a flint, to activate an electronic switch in a lamp module contained in an outer metal shell of a flashlight insert for use in an oil-type cigarette lighter outer case.

It is a further object of the present invention to provide means to select either of two different light sources in a lamp module located in an outer metal shell of a flashlight insert for use in an oil-type cigarette lighter outer case.

It is a further object of the present invention to provide a charging circuit and a rechargeable battery module located in an outer metal shell of a flashlight insert for use in an oil-type cigarette lighter outer case.

Toward the fulfillment of these and other objects, this invention includes a lamp module containing light emitting diodes (LEDs) and a battery module, both housed inside of an outside metal shell to make a flashlight insert for inserting into an oil-type cigarette lighter outer case. These modules utilize the direct contact of a battery terminal to the inside of a metal shell to complete the electrical circuit. One or more LED's are used as the light source providing long battery life and high brightness. These flashlight inserts can be utilized in both the standard size and the small size oil-type lighter cases (such as the zippo brand). This provides a bright compact pocket or purse light source for general nighttime lighting for traveling or camping as well as a compact emergency light source for home or business use. These flashlights are very compact and thin. They have smooth covered outside surfaces making them ideal to carry. They are attractive and the cases can be decorated to suit the owner. Existing lighters can easily be retrofitted with the battery and LED modules to convert an existing oil-type cigarette lighter to a flashlight. In addition, new flashlights can be manufactured utilizing an existing lighter insert metal shell as used in oil-type lighters, or they can be made from a new special purpose metal shell-making it easy to go into production with this type of flashlight. The components required to convert the lighters to flashlights are readily available and are low cost. Batteries can be easily changed as required or recharged by an external charger. These flashlights are activated by movement of the lighter lid or by a separate manually operated switch or by a spark from added lighter ignition components.

BRIEF DESCRIPTION OF THE DRAWINGS

Advantages of the invention will be readily appreciated as the same becomes better understood by reference to the following detailed description when considered in connection with the accompanying figures. All figures contain common reference numbers to identify corresponding functional elements from one figure to another, and three digit numbers beginning with 110 are used with an arrow to indicate assemblies or sub-assemblies, wherein:

FIG. 14A is a side view of a dual LED lamp module containing two LEDS with different light characteristics, a selector switch, and a movable switch element.

FIG. 14B is a perspective view of the dual LED lamp module of FIG. 14A being assembled into a plastic housing.

FIG. 14C is a top perspective view of a dual LED lamp module.

FIG. 14D is a bottom perspective view of a dual LED lamp module.

FIG. 15 is a front perspective view of a flashlight insert containing the dual lamp module of FIG. 14C and FIG. 14D.

FIG. 16A is a side perspective view of a preferred embodiment flashlight insert utilizing an outer metal shell.

FIG. 16B is a left side view of the flashlight insert of FIG. 16A.

FIG. 16C is a top view of the flashlight insert of FIG. 16A.

FIG. 16D is a right side view of the flashlight insert of FIG. 16A.

FIG. 16E is a bottom view of the flashlight insert of FIG. 16A.

FIG. 17 is a perspective view of the right side and left side of the outer metal shell of the flashlight insert of FIG. 16A.

FIG. 18 is a perspective view of a partial installation of a preferred lamp module, battery module, and toggle switch assembly into the outer metal shell of FIG. 17.

FIG. 19A is a front perspective view of a preferred embodiment of a lamp module.

FIG. 19B is a top view of FIG. 19A.

FIG. 19C is a reversed rear perspective view of FIG. 19A.

FIG. 19D is a bottom perspective view of FIG. 19C.

DESCRIPTION OF THE PREFERRED EMBODIMENTS

Figure 1:
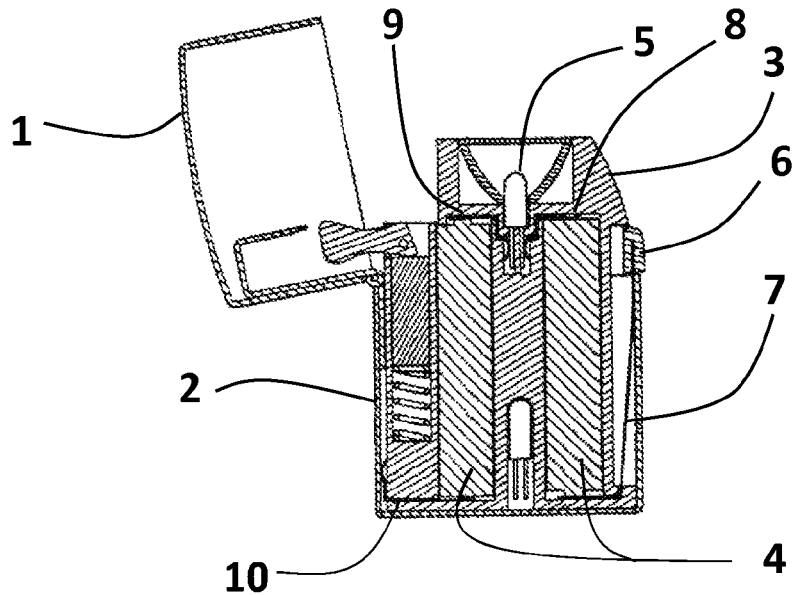
FIG. 1 is a side cross-section view of a prior art flashlight.
Figure 3A:
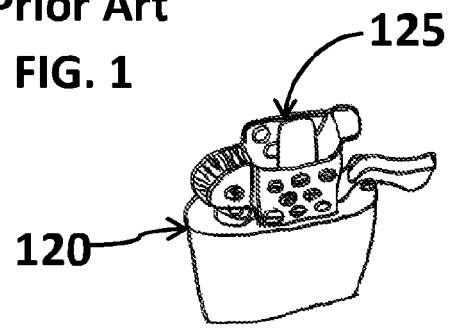
FIG. 3A is a top perspective view of a flashlight insert assembly for fitting into an oil-type cigarette lighter outer case.
Figures 2, 3B:
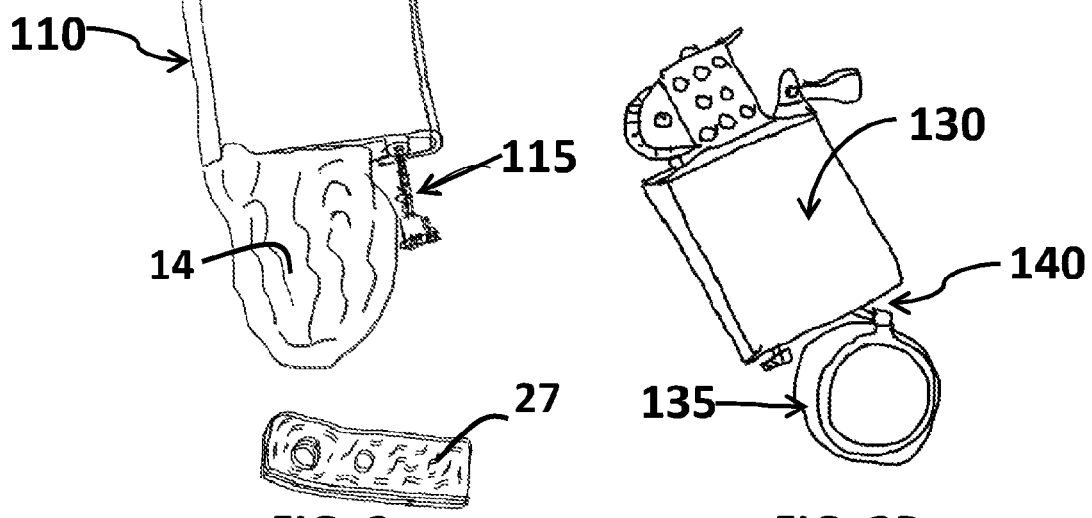
FIG. 2 is a perspective view of the main components removed from an oil-type lighter insert to convert it to an outside metal shell.
FIG. 3B is a side perspective view of the flashlight insert of FIG. 3A, showing the main subassemblies.

FIG. 2 is an oil-type cigarette lighter insert assembly 110 showing the main components partially removed in order to convert it to an outer metal shell 130 (shown in FIG. 3B) for use in a flashlight insert 120 (shown in FIG. 3A). The components removed include a wick 11, lighter fluid absorbent 14, felt pad 27, and the flint tube assembly 115 which may also include a spark wheel. FIG. 3A is a top perspective view of a flashlight insert 120 to fit an oil-type cigarette lighter outer case 2 (as shown in FIG. 1). FIG. 3B is a side perspective view of the flashlight insert of FIG. 3A with the battery module 135 removed. The lighter insert outer metal shell 130 becomes a basic flashlight insert 120 by the addition of a battery module 135 connected by an insulated conductor assembly 140 to a lamp module 125. The flashlight insert is then assembled into an outer cigarette lighter case 2 (as shown in FIG. 1) which has a hinged lid 1.

Figure 4A:
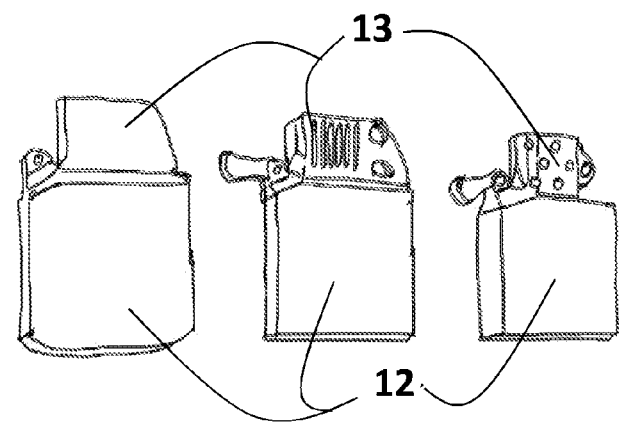
FIG. 4A is a side view, a perspective view, and a bottom view of a 1st outer metal shell.
Figure 4B:
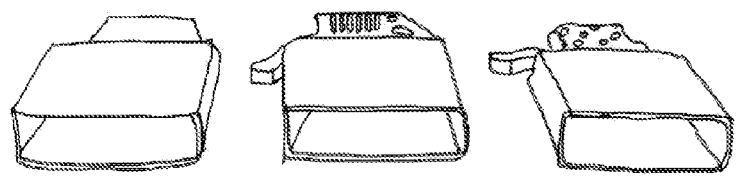
FIG. 4B is a side view, a perspective view, and a bottom view of a 2nd outer metal shell.
Figure 4C:
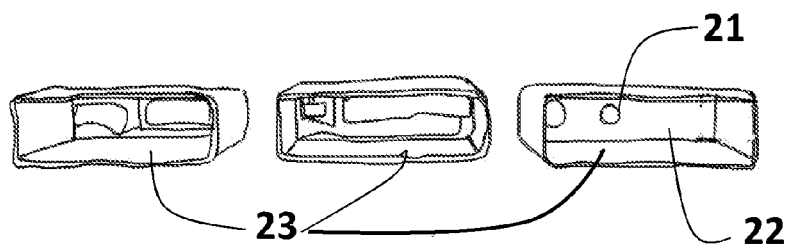
FIG. 4C is a side view, a perspective view, and a bottom view of a 3rd outer metal shell.

FIG. 4A, FIG. 4B, and FIG. 4C show three different levels of outer metal shells for use in flashlight inserts. Each FIG. has three different views; view I, view II, and view III. View I is a front perspective view. View II is a front perspective view at an oblique angle so that the open bottom of the outer metal shell is partially in view. View III is a perspective view of the open bottoms of the three outer metal shells. All three of the outer metal shells have an open bottom chamber 12 of a rectangular cross-section connected to an open top chamber 13 of a rectangular cross section, where the bottom chamber 12 is generally larger than the top chamber. The bottom chambers 12 have closely spaced planar inside surfaces 23. In FIG. 4C, view III, the outer metal shell has a thin wall 22 separating the bottom chamber 12 from the top chamber 13. It also has a hole (wick hole) 21 connecting the bottom chamber 12 to the top chamber 13. FIG. 4A and FIG. 4B, at view III, show outer metal shells that are completely open between chambers 12 and 13. The outer metal shells of FIGS. 4B and 4C have the original enclosed wind guards as the top chambers 13 and the original empty lighter fuel containers as the bottom chambers 12. FIG. 4A shows a top chamber 13 that is not an original wind guard, but retains the same general outside shape as the outer metal shell of FIG. 4B. Existing cigarette lighter inserts can be easily converted to outer metal shells as shown in FIG. 4B and FIG. 4C or a new outer metal shell may be manufactured as in FIG. 4A. All outer metal shells are generally manufactured from stainless steel and are electrically conductive. The outer metal shells have about 0.015 inch wall thickness and have about a 3:1 front width-to-side depth aspect ratio.

Figure 5:
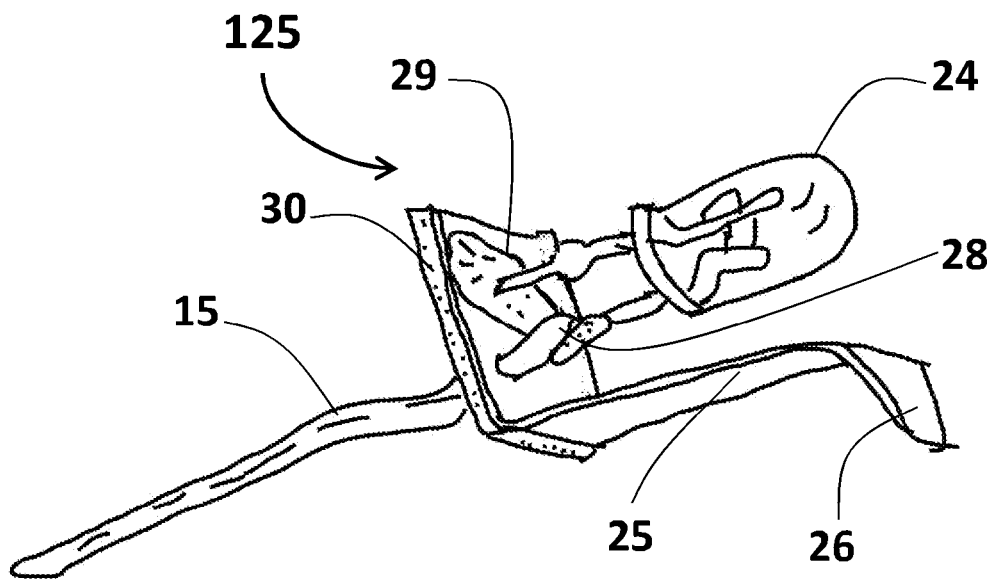
FIG. 5 is a perspective view of a preferred lamp module.
Figure 6:
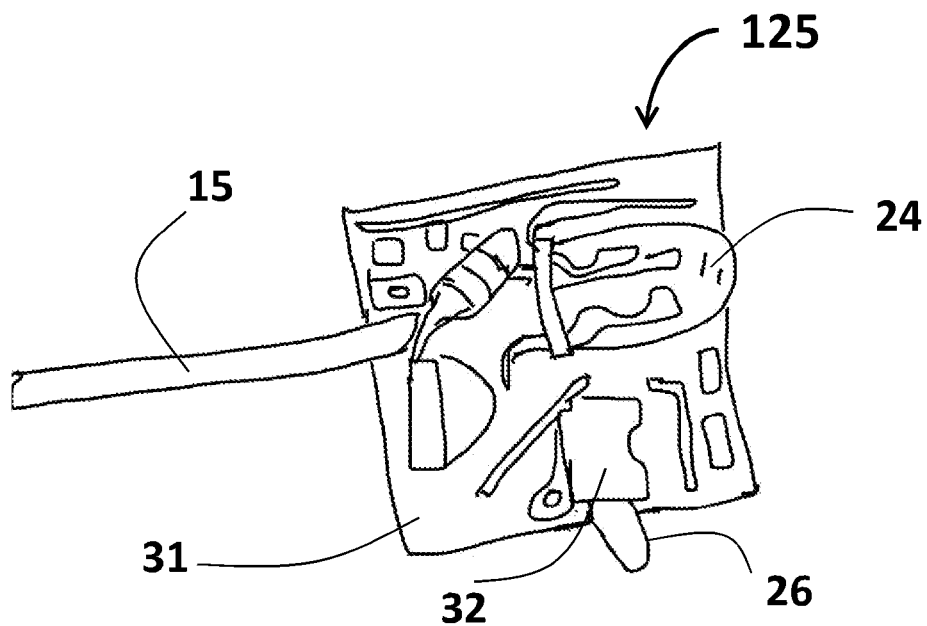
FIG. 6 is a perspective view of an alternate electronic lamp module.

FIG. 5 is a lamp module 125 consisting of an LED lamp 24, a flat, electrically conductive, switch element 25 and an insulated conductor 15. The flat switch element 25 has an electrically insulated tip 26, and it is bent into a "z" shape and has a second terminal of the LED lamp 24 soldered at 29 to the top surface. The insulated conductor 15 passes through a hole in the flat switch element 25 and is soldered at 28 to a first terminal of the LED lamp 24. Electrical insulation 30 is provided on the underside of lower part of switch element 25. FIG. 6 is a lamp module 125 providing an electronic switch option having an LED lamp 24, an insulated conductor 15, a circuit board assembly 31, a switch 32, and an insulated tip 26. The circuit board assembly 31 detects a spark from a spark wheel assembly 115 attached to the outer metal shell 130, and then turns on LED 24. The switch 32 will turn off the LED 24 when the lid 1 of an outside oil-type cigarette lighter case 2 is closed.

Figure 7:
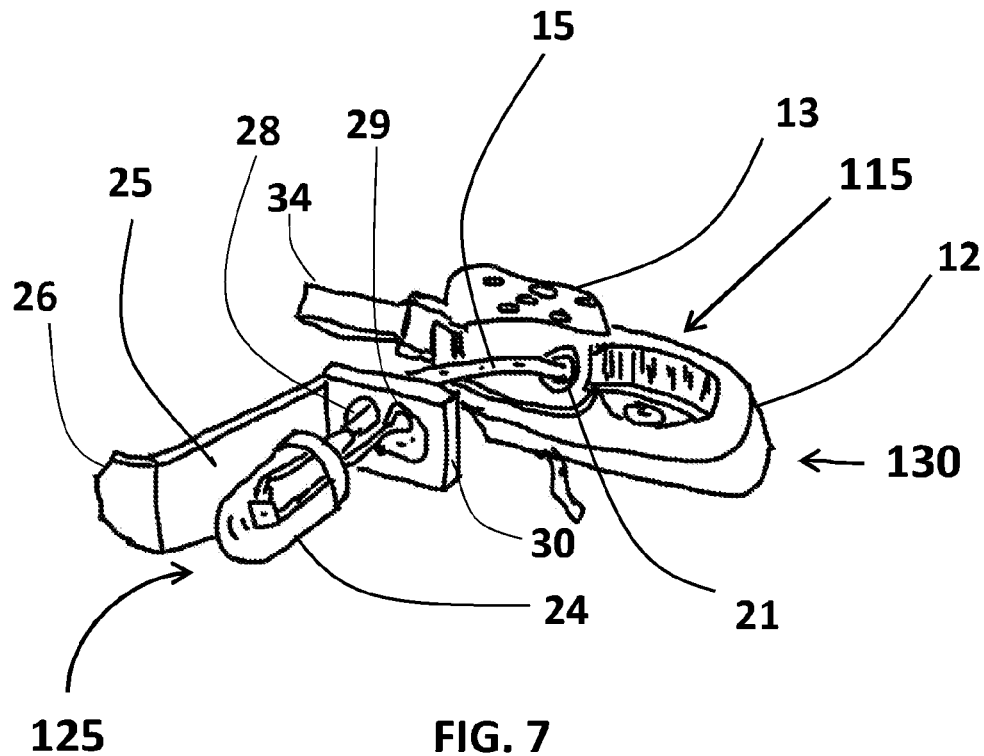
FIG. 7 is a perspective view of the lamp module of FIG. 5 being inserted into an outer metal shell that has a spark wheel assembly.
Figure 8:
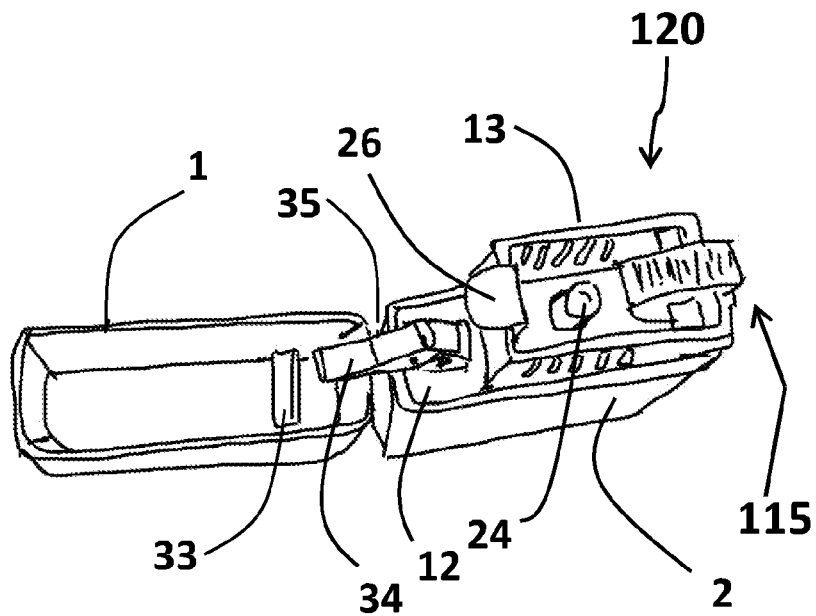
FIG. 8 is a perspective view of a flashlight insert, containing an outer metal shell and a spark wheel assembly, and assembled into an outside cigarette lighter case.
Figure 9:
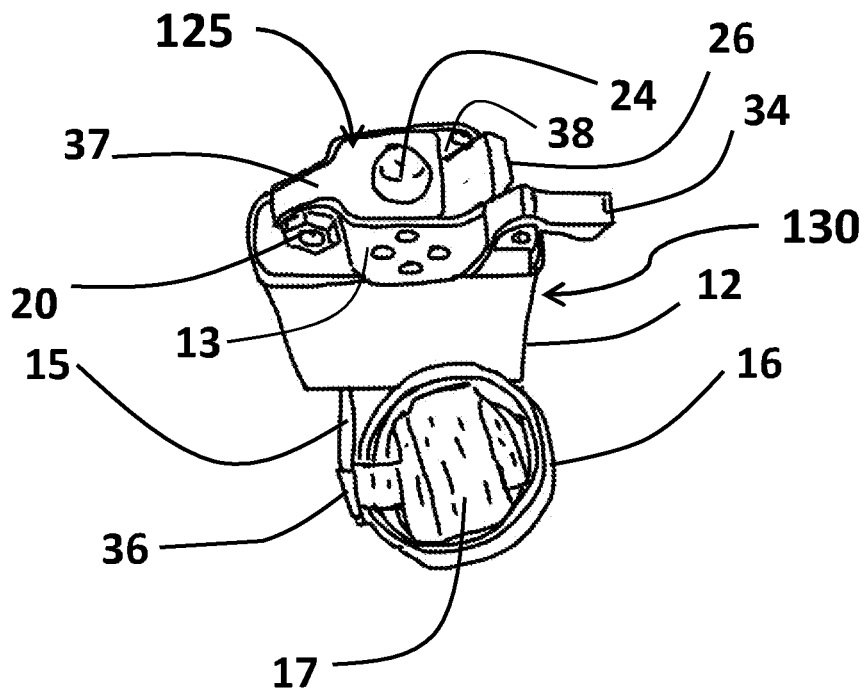
FIG. 9 is a perspective view of a preferred embodiment showing a lamp module installed in an outer metal shell and an attached battery holder.
Figure 10:
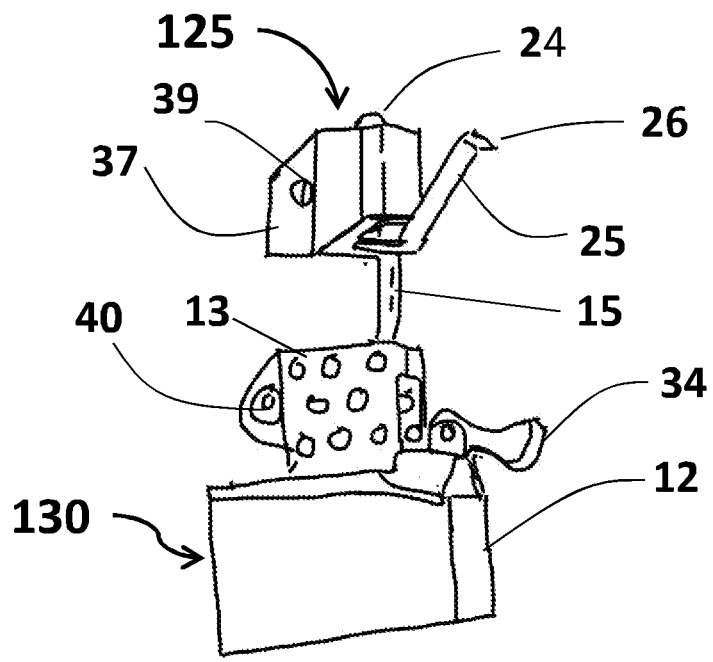
FIG. 10 is a partial perspective view of the installation of a lamp module into an outer metal shell.
Figure 11:
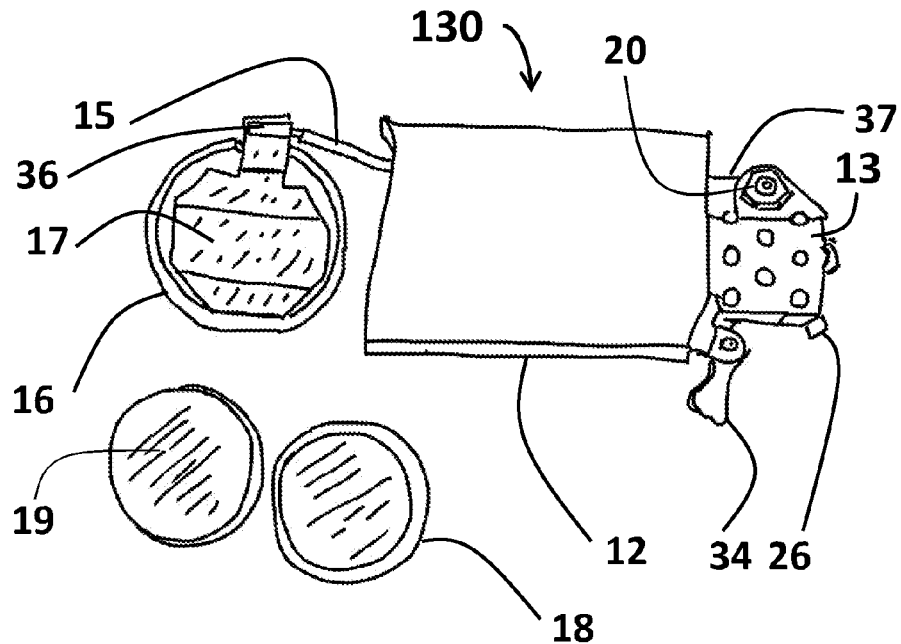
FIG. 11 is a side view of FIG. 9, including batteries.

FIG. 7 and FIG. 8 show the insertion of a lamp module 125, of the type shown in FIG. 5, into the top chamber 13 of an outer lighter shell 130 of the type shown in FIG. 4C. In addition, the spark wheel assembly 115 has not been removed and the lid cam 34 is present. FIG. 7 illustrates a partial assembly of the lamp module 125 into the top chamber 13 where the insulated conductor 15 is passing through a hole 21. The insulated conductor 15, which is a part of an insulated conductor assembly 140, is connected to a battery module 135 located within the bottom chamber 12 of the outer metal shell 130. An electrically insulating adhesive is applied at 30 to hold the lamp module 125 at the hole location 21. FIG. 8 shows the flashlight insert 120 made by completing the assembly of the lamp module 125 into the top chamber 13 of the outside metal shell 130 and connecting the lighting module 125 to a battery module 135 located in the bottom chamber 12 of the outer metal shell 130. The completed flashlight insert 120 is then inserted into an outer case 2 of an oil-type cigarette lighter. Lid 1 of the outer case 2 has a hinge extension 33 which pushes against insulated end 26 of the flat spring contact 25 to break the electrical circuit between a battery terminal 19 (shown in FIG. 12) and the outer metal shell 130 when the outer case lid 1 is closed. This turns off the LED 24 in the lighting module 125. When the lid 1 is opened, the insulated contact 26 is released from the oil-type lighter outside case hinge extension 33 and the flat spring contact 25 contacts the outer metal shell 130 completing the circuit from battery terminal 19 through the outer metal shell 130 to the LED 24 connection 29 in the lamp module 125. The lamp module 125 and the battery module 135 can easily be used to retrofit an existing oil-type cigarette lighter insert after removing the absorbent and wick as shown in FIG. 3A. This makes it possible for a person to convert their existing cigarette lighter to a flashlight by buying a kit composed of the lamp module 125 and a battery module 135.

Figure 12:
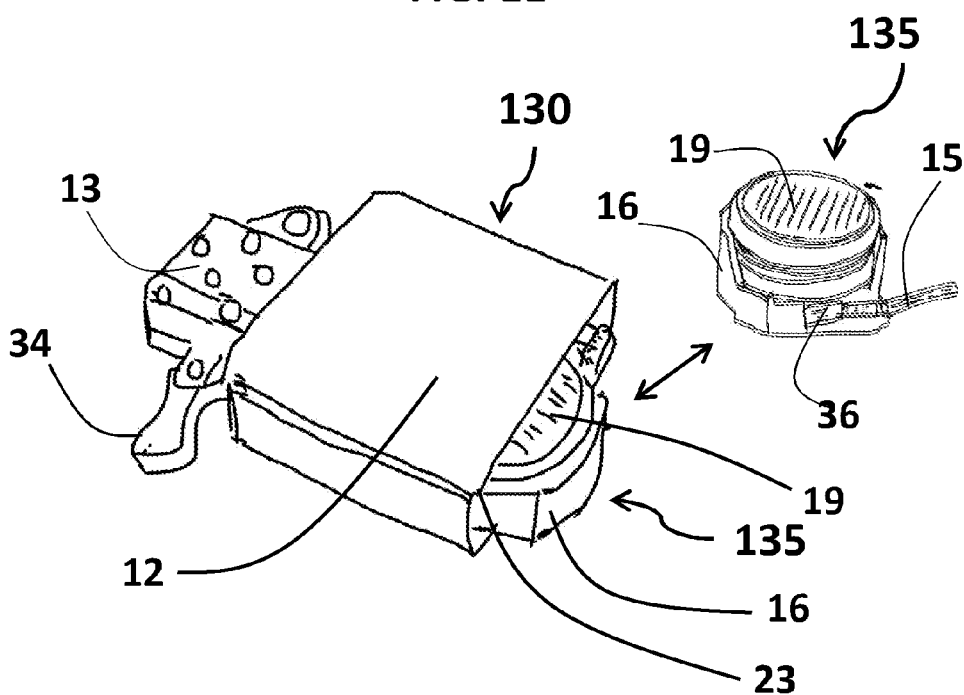
FIG. 12 is a perspective view of a battery module and a partially installed battery module making electrical contact to a planar inside surface of an outer metal shell.

FIG. 9, FIG. 10, FIG. 11, and FIG. 12 show a preferred embodiment of a flashlight insert 120 made by inserting a lamp module 125 into an outer metal shell 130 and attaching a battery holder 36 to an insulated wire 15 that connects to one lead of the LED 24 within the lamp module 125. Lamp module 125 includes a plastic retainer 37 and a screw 20 to attach the lamp module 125 to the top chamber 13 through a mounting hole 40 of the outer metal shell 130. Spring contact 25 (shown in FIG. 10) makes electrical contact with the inside of the top chamber 13 and the insulated tip 26 protrudes over the top edge of the top chamber 13. A battery holder 16 is a cup-shaped plastic container. A flat electrical spring contact 17 attached at 36 to an insulated conductor 15, together with the plastic container 16, form an insulated conductor assembly 140. This attachment 36 can be a crimp, solder joint or a two piece connector. Batteries are placed into the cup shaped container 16 on top of spring contact 17 to make a battery module 135 which is inserted into the bottom cavity 12 of outer metal shell 130 as shown in FIG. 12. A first battery terminal 19 makes contact with an inside planar surface 23 of outer metal shell 130. A first terminal of LED 24 is connected by the insulated wire 15 which is connected to the spring contact 17 that is in contact with a second battery terminal of opposite polarity from the first battery terminal. A second lead of the LED 24 is connected to the flat spring contact 25 which is in contact with the top chamber 13 of the outer metal shell 130 connected to the first battery terminal 19. In this configuration, the LED 24 in the lamp module 125 is turned on. When the flashlight insert 120 is placed into a cigarette lighter outside case 2 (see FIG. 8) and lid 1 is closed, insulated tip 26 pushes against the hinge extension 33 in the lighter lid 1. This causes the flat spring contact 25 to break contact with the top chamber 13 of the outer metal shell 130, thereby turning off LED 24.

Figure 13:
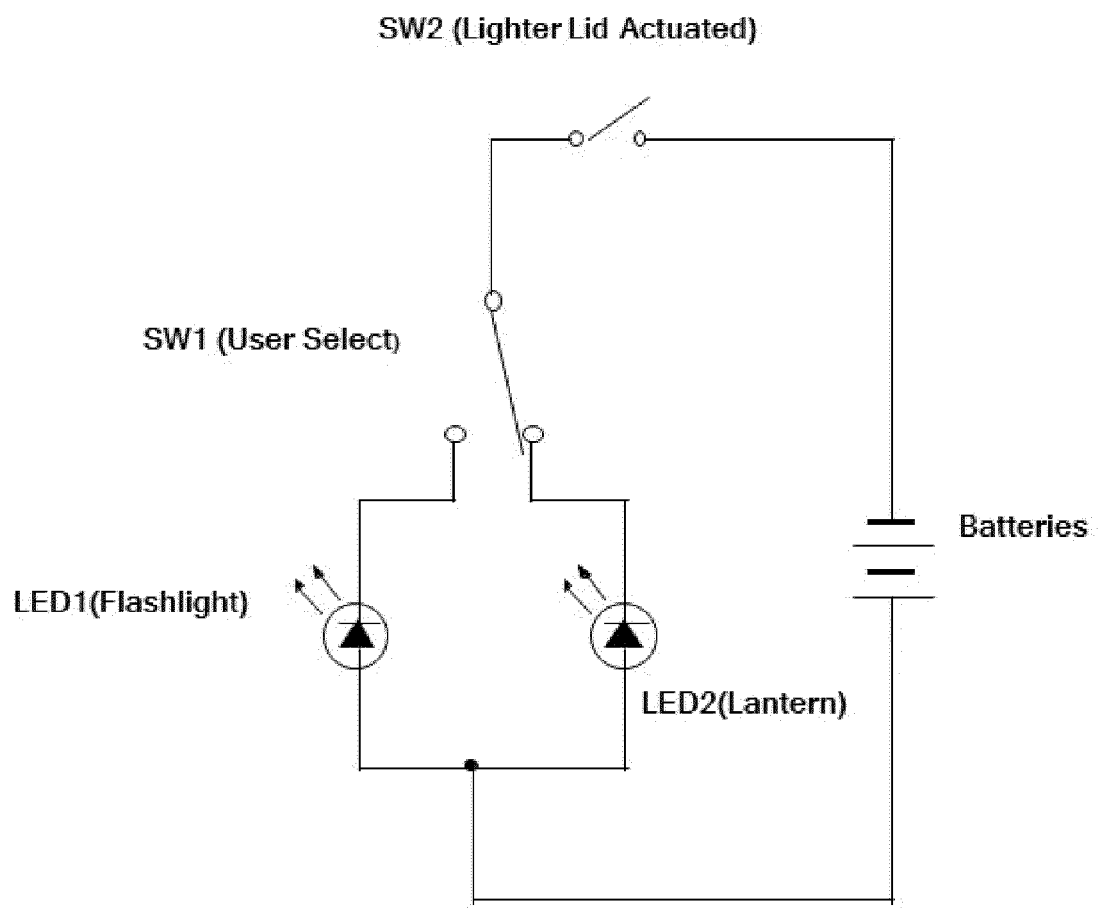
FIG. 13 is an electrical schematic of two different LEDs connected to batteries by a selector switch and a lighter lid actuated switch.

FIG. 13 is a schematic of a dual LED circuit for a lamp module 125 contained in an upper chamber 13 of an outer metal shell 130 of a flashlight insert 120. LED1 and LED2 have different light characteristics, such as color, light focus, etc. For illustrative purposes, the LEDs shown have LED1 as a focused flashlight and LED2 as a diffused lantern. LED1 or LED2 can be selected by SW1. SW2 is activated by a lid 1 of an oil-type cigarette lighter. SW2 connects the selected LED to the batteries as shown. FIG. 14A is a lamp module 125 containing a first LED 24 (SW1) and a second LED 42 (SW2). A selector switch 44 (SW1), an insulated conductor 15, and a movable switch element 25 are attached to a small circuit board 45. Selector switch 44 has a push button extension 43 for activating it. Pushing button 43 selects one of the LEDs, pushing it again selects the other LED. Movable switch element 25 has an electrically insulated tip 26. FIG. 14B shows lamp module 125 being inserted into a plastic retainer 46 having a mounting hole 47. FIG. 14C is the completed assembly of the lamp module 125 and the plastic retainer 46. FIG. 14D is a bottom view of the lamp module 125 contained inside retainer 46. The lamp module 125 is recessed above the bottom surface 49 of the retainer 46 in a channel 48. This electrically isolates the lamp module 125 (except for movable switch element 25) from the outer shell 130 when the lamp module 125 is assembled into the outer metal shell 130. FIG. 15 is the completely assembled flashlight insert 120 containing the lamp module 125 and battery module 135 (as shown in FIG. 12). The lamp module 125 is held in place in the top chamber 13 (wind guard) by a screw or rivet 40 through attachment hole 47 in retainer 46. The push button extension 43 of selector switch 44 extends outward below retainer 46. The flashlight insert 120 contains cam 34 for closing the lid 1 of an oil-type cigarette lighter outside case 2, when the flashlight insert 120 is inserted in the outside case 2. Once the Led, 24 or 42, is selected by a user, the flashlight insert 120 functions exactly like the flash light insert 120 as described above.

FIG. 16A is a flashlight insert 120 for inserting into an oil-type cigarette lighter outer case 2. The flashlight insert 120 has an outer metal shell 130 which has a top chamber 13 and a bottom chamber 12. The outer metal shell 130 has movable cam 34 attached by a rivet 55. FIG. 16B is a left side view of FIG. 16A showing a movable switch element 63, a screw 53 for attaching a lamp module 125 to the bottom chamber 12, and a closure 51 over the open end of the bottom chamber 12. FIG. 16C, a top view of FIG. 16A, shows a plastic housing 50 held in place by a folded edge of the top chamber 13. Led 24 extends through the top of plastic housing 50. FIG. 16D is a right side view of FIG. 16A and FIG. 16E is a bottom view of FIG. 16A. The bottom cover 51 is held in place by a screw 54 which attaches to plastic housing 51. FIG. 17 are two different perspective views of the outer metal shell 130 of the flashlight insert 120 of FIG. 16A. This is also the same outer metal shell 130 shown in FIG. 4A. The outer metal shell 130 is not made from a modified cigarette lighter insert 110, but has the same general outside shape to fit an oil-type cigarette lighter outer case 2 or to fit any outer case equivalent to a cigarette lighter outer case 2. The outer metal shell 130 of FIG. 17 has folded surfaces 58 and 60 and a hole 56 for attaching and holding a lamp module 125. Surfaces 59 and 61 match the inside surfaces of an oil-type cigarette lighter outer case 2. A lid cam 34 mounting hole is provided in upward extending projections 57 of the top chamber 13. FIG. 18 shows the partial assembly of a lamp module 125 and a battery module 135 into an outer metal shell 130 with toggle switch assembly 145 yet to be assembled into the lamp module 125 and the outer metal shell 130. A plastic battery holder 68 contains a battery with a terminal 19 making electrical contact to an inside planar surface 23 (see FIGS. 4A and 4B) of the bottom chamber 12 of the outside metal shell 130. Cam 34 of subassembly 145 is attached by a screw or a rivet through hole 62 in cam 34 and hole 57 in outer metal shell 130.

FIG. 19A is a front view of a lamp module 125 as was shown partially assembled into an outer metal shell 130 in FIG. 18. This lamp module 125 has a plastic housing 50 which extends from the top chamber 13 through the bottom chamber 12 of an outer metal shell 130 of the flashlight insert 120 shown in FIG. 16A. Lamp Module 125 is made up of a plastic housing 50 containing one or more LEDs 24 contained in a hollow part 70. One lead 85 of LED 25 is soldered to an electrically conductive switch element 81 and the other LED lead is soldered to an insulated wire 15 that passes through a hole in switch element 81. Wire 15 is soldered to a resistor 83 and resistor 83 is soldered to a battery contact 75, where battery contact 75 is electrically insulated from an inside planar surface 23 (see FIG. 4A) of an outer metal shell 130 by a plastic surface 68 of plastic housing 50. Insulated wire 15, resistor 83, battery contact 75, and plastic surface 68 make up an insulated conductor assembly 140. Resistor 83 is chosen to set an operating current level in LED 24. Switch element 81 makes electrical contact with a moving switch element that is a part of toggle switch assembly 145 shown later in FIG. 22 through FIG. 26. Battery contact 75 has a spring portion 84 to provide a positive contact to a battery terminal. Raised ribs 72 and 74 are provided on plastic housing 50 to lock it into the outer metal shell 130. Plastic housing 50 has a thin outer wall 67 with an inside surface 68. This thin wall provides electrical insulation between battery contact 75 and the outer metal shell 130 when the lamp module 125 is inserted into outside case 130. A curved inside projection 82 is a battery module 135 locator. An opening into the plastic housing 50 is defined between surfaces 76 and 79. A moving switch element 63 (see FIG. 22) will project into this opening to make electrical contact with switch element 81. FIG. 19B is a top view of the lamp module 125 of FIG. 19A. The surface 73 is slightly below surface 67 to fit into the top chamber of an outside shell 130. A slot 77 is provided to receive the end 93 of a moving switch element 63 (see FIG. 22). The surface 78 defines the front surface of lamp module 125 that is in direct contact to an inside planar surface 23 of a bottom chamber 12 of an outside metal shell 130. FIG. 19C is the back side of FIG. 19A (reversed) showing dividing line 69 that is a step down from surface 67 to surface 73. FIG. 19D is a bottom perspective view of FIG. 19C. Hole 80 is for a screw 54 attachment of a bottom cover 51 shown in FIG. 16E.

Figures 20A, 20B:
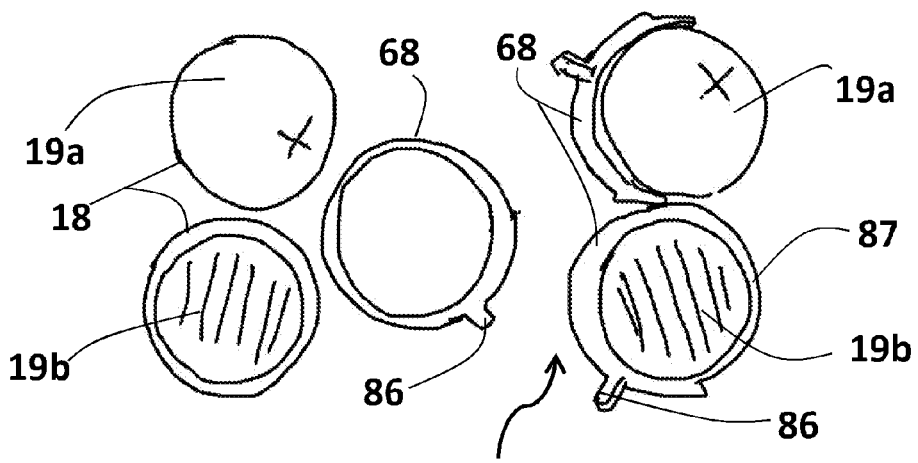
FIG. 20A is a top view of two batteries and a plastic retaining ring to contain the batteries.
FIG. 20B is a top and bottom perspective view of a battery module made from the components shown in FIG. 20A.
Figures 21A, 21B:
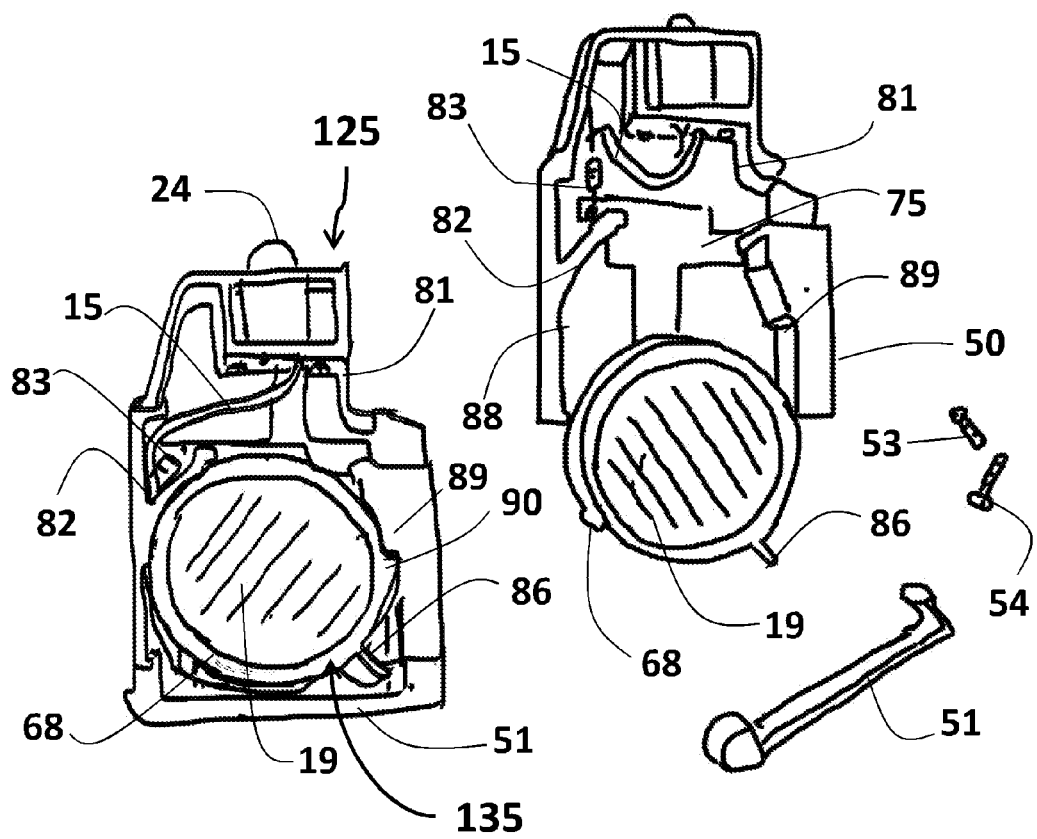
FIG. 21A is a front perspective view of a preferred embodiment of a lamp module, shown in FIG. 19A, containing the battery module of FIG. 20B.
FIG. 21B is the same view as FIG. 21A except that the battery module of FIG. 20B is partially removed.

In FIG. 20A there are two batteries 18 with a first battery terminal 19a and a second battery terminal 19b. Also shown is a plastic battery holder 68 with an assembly tab 86. FIG. 20B is a front and rear view of battery module 135 after batteries 18 are assembled into battery holder 68. A lip 87 prevents the batteries 18 from sliding through the holder 68 and exposes terminal 19b for contact with an outer metal shell 130. FIG. 21A is a lamp module 125 containing a battery module 135. A projection 89 on plastic housing 50 matches a projection 90 on battery holder 68 to limit rotation of the battery module 135. With a bottom cover 51 removed, the battery module 135 is inserted into the lamp module 125 and tab 86 is rotated into the position shown. Tab 86 is rotated clockwise and then pulled out to remove the battery module 135. FIG. 21B shows the battery module partially removed from the lamp module after removing bottom cover 51 by removing screw 54. Screw 53 is for attachment of a lamp module to an outer metal shell.

Figure 22:
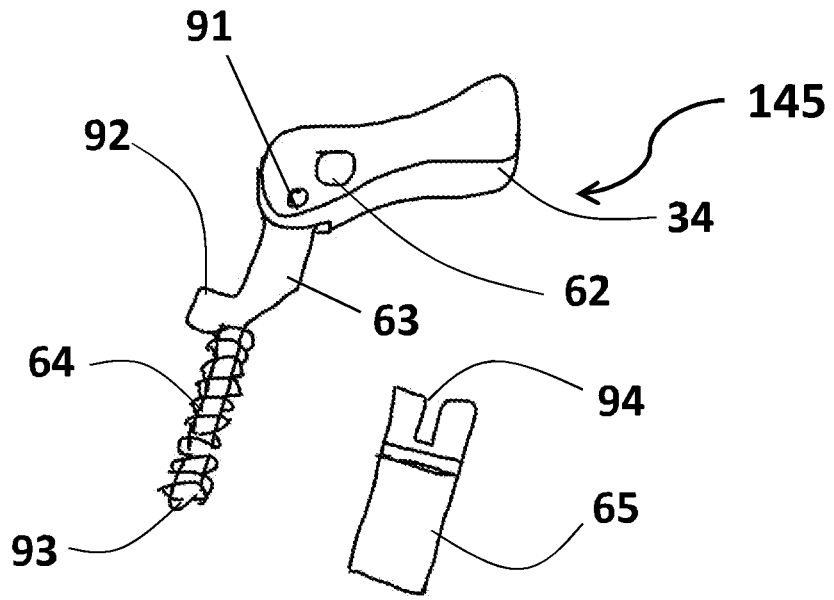
FIG. 22 is a perspective view of a toggle switch assembly and a contact element contained within the flashlight insert shown in FIG. 16A.
Figure 23:
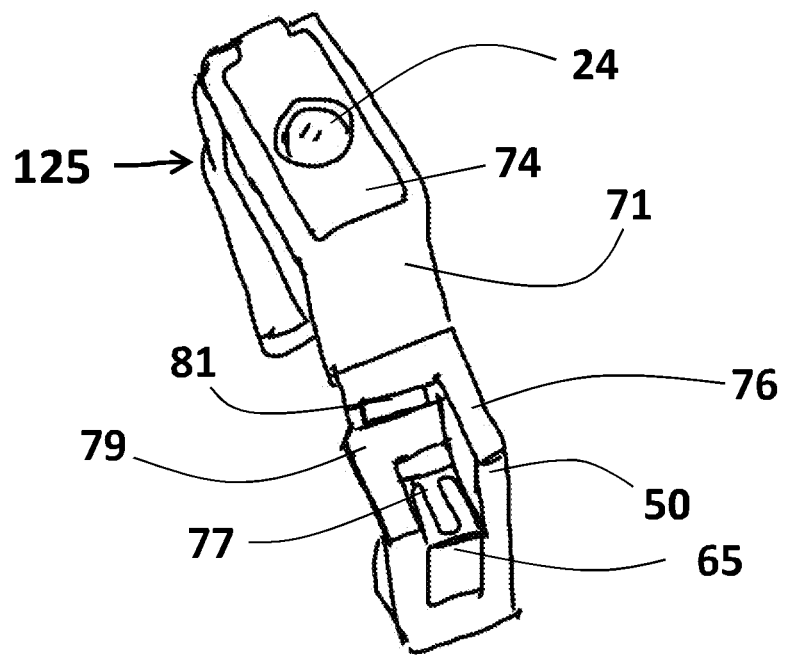
FIG. 23 is a top perspective view of a lamp module as shown in FIG. 19A, FIG. 19B, FIG. 19C, and FIG. 19D with the contact element shown in FIG. 22 assembled to the lamp module.
Figures 24, 25:
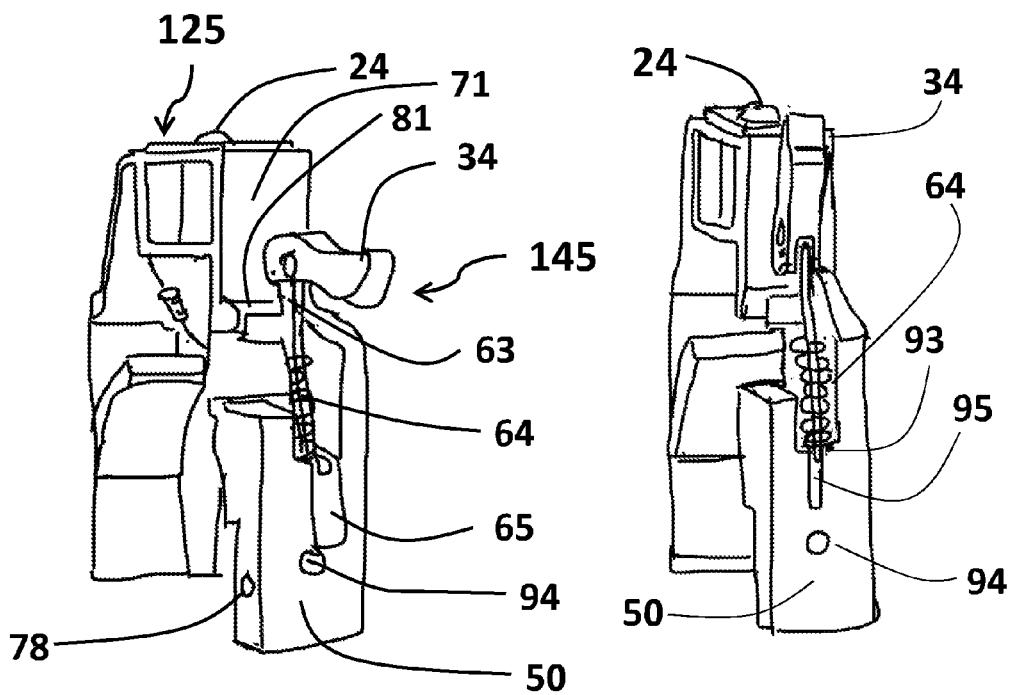
FIG. 24 is an oblique front perspective view of the lamp module in FIG. 19A with the components of FIG. 22 installed.
FIG. 25 is the same as FIG. 24 except the contact element of FIG. 22 is replaced by an open slot in the lamp module.
Figure 26:
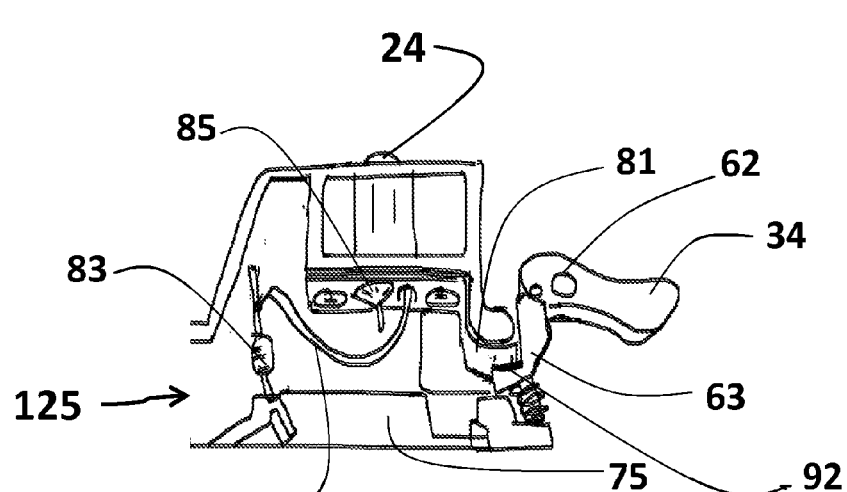
FIG. 26 is a partial side perspective view of a lamp module and toggle switch assembly as shown in FIG. 24 and FIG. 25.

FIG. 22 is a toggle assembly 145 with a movable switch element 63 and a contact 65. The toggle assembly 145 is used to close the lid 1 of an outside oil-type cigarette lighter case 2 and also to provide an electrical contact to turn on LED 24 in lamp module 125. Cam 34 is connected to movable contact 63 by pin 91 which is offset from the cam 34 mounting hole 62. A spring 64 is placed over movable switch element 63. Movable switch element 63 has an end 93 and an electrical contact boss 92 which is also the retainer of spring 64. FIG. 23 shows the placement of contact 65, having an open slot 94, over slot 77 in the plastic housing 50. The end 93 of movable contact 63 makes electrical contact with contact 65 which also makes electrical contact to the inside of an outer metal shell 130 when the lamp module 125 is inserted into the outer metal shell 130. FIG. 24, FIG. 25, and FIG. 26 are views of a toggle switch assembly 145 inserted into a lamp module 125. In FIG. 24, contact 65 is shown assembled to plastic housing 50 and movable contact element 63 is connected to switch contact 81 when cam 34 is in the position shown. Contact 65 touches an inside surface of an outer metal shell 130 when the lamp module 125 is inserted into it. This completes a circuit to the battery module 135, which has a terminal 19 also touching an inside planar surface 23. This turns on LED 24 in lamp module 125. Cam 34 is secured to a metal outer shell 130 as shown in FIG. 16A. When cam 34 is lifted up (as shown in FIG. 25) by the closing of a lid 1 of an oil-type cigarette lighter outer case 2, movable contact element 63 breaks connection to contact element 81 and LED 24 is turned off. FIG. 25 shows an alternate method of making direct contact from a movable switch element 63 to an outer case 130. Slot 77 in FIG. 23 is opened up to the outside surface of plastic housing 50 to become a new slot 95. When the lamp module 125 is inserted into an outer metal shell 130, the tip 93 of movable contact element 63 touches an inside surface of the outer metal shell 130. This establishes a direct electrical contact to battery terminal 19 which also touches an inside planar surface 23 of the outer metal shell 130. Slot 95 provides an alternative to the use of contact 65 for making a connection between a movable switch element 63 and an outer metal shell 130. Hole 94 in plastic housing 50 is for a screw attachment 53 to outer metal shell 130 as shown in FIG. 16B. FIG. 26 is a partial side view of lamp module 125 where movable switch element 63 has a projection 92 in direct contact with switch contact 81. This contact occurs when cam 34 is normally down following assembly into an outer metal shell. Switch contact 81 is soldered to one lead 85 of LED 24 completing the electrical circuit to terminal 19 in battery module 135. In FIG. 25, lamp module 125 with toggle switch assembly 145 is in position for insertion into an outer metal shell 130. After the assembly, the spring 64 is compressed and cam 34 is secured to outer metal shell 130.

Figure 27:
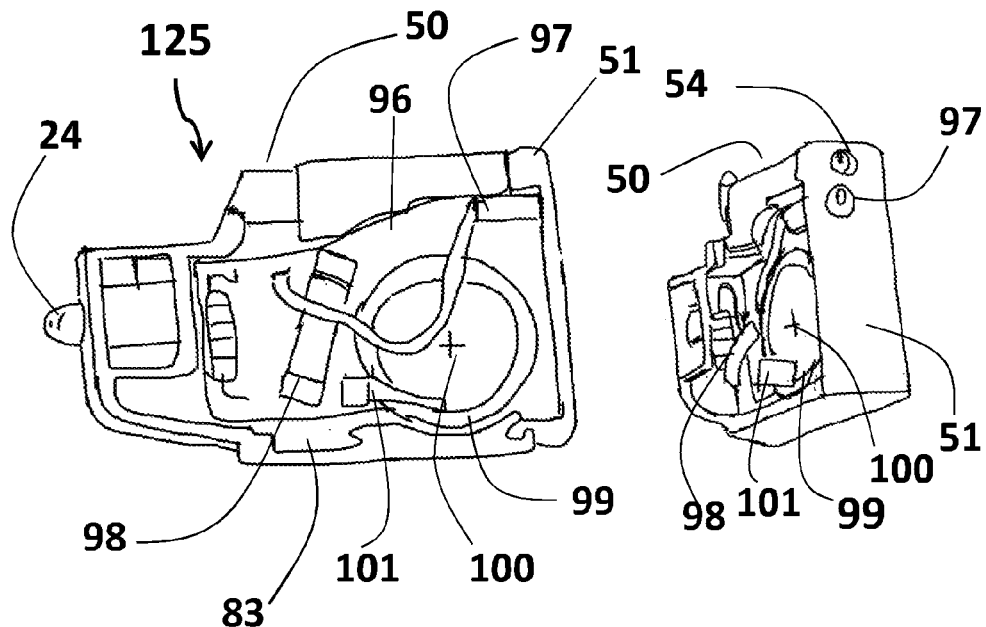
FIG. 27 is a side and a bottom perspective view of a rechargeable lamp module assembly.
Figure 28:
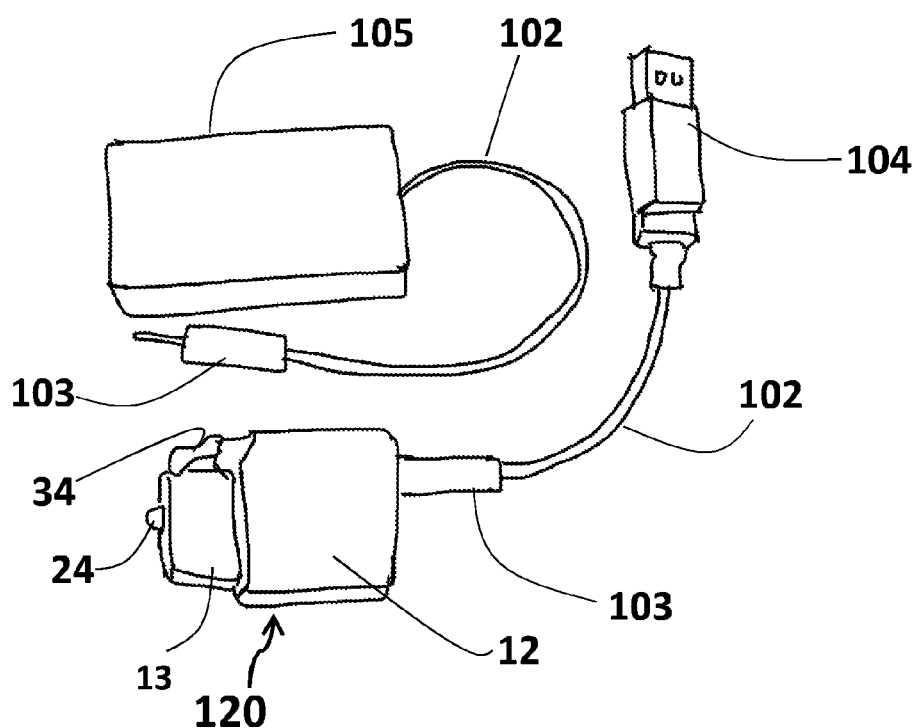
FIG. 28 is a side perspective view of a rechargeable flashlight insert, containing the lamp module shown in FIG. 27, and with outside power sources for recharging the flashlight insert.

FIG. 27 is a lamp module 125 containing an electronic circuit assembly 96, rechargeable battery 99, and battery charging port 97. Battery 99 has a first battery terminal 100 connected to a first battery contact 101 which is connected to electronic circuit assembly 96. First battery contact 101 is connected to an insulated conductor assembly 140 which is connected to a first terminal of LED 24 in lamp module 125. A second battery terminal (not shown) of battery 99 having opposite polarity from the first battery terminal 100 is connected to and is facing electronic circuit assembly 96. A second battery contact 98 is attached to the electronic circuit assembly and makes a connection through the electronic circuit assembly to the second battery terminal. The second battery contact 98 is a bent flat spring that extends from the electronic circuit assembly 96 beyond the outer surface 83 of the plastic housing 50. Battery contact 98 engages a planar surface 23 inside of an outer metal shell 130 when the lamp module 125 is assembled into an outer metal shell 130. An electrical connection is made through a movable switch element 63 to an outer metal shell 130 in the same manner as described above, connecting a second terminal of LED 24 to a second battery contact 98 to turn on LED 24. LED 24 is turned off when a movable switch element 63 breaks contact between a second lead of LED 24 and an outside metal shell 130. The electronic circuit assembly 96 has a built in battery charging means to recharge the battery 99 through a charging port 97 that extends through lower plastic cover 51. FIG. 28 shows a complete rechargeable flashlight insert 120 containing a lamp module 125 with LED 24 in a top chamber 13 and a rechargeable battery 99 in a bottom chamber 12. Cam 34 is shown in the up (LED 24 off) position for recharging battery 99. Two different external power supply options are shown. The first option is a cable 102 with a connector 103 that plugs into charging port 97. The other end of cable 102 has a USB connector for plugging into a USB five volt computer bus or a USB five volt plug-in power supply. The second power supply option shown has a cable 102 with connector 103 for connecting to charging port 97. The other end of cable 102 terminates at a battery box 105 containing batteries that provide about 4.5 volts to recharge battery 99.

A new removable flashlight insert to fit an oil-type cigarette lighter outer case has been disclosed in the examples above. These examples have several features in common, including an outer metal shell and an LED lamp module and a removable battery module. However, there are other distinguishing features that set them apart from one another, resulting in unique claims. Accordingly, it is appropriate that the appended claims be construed broadly and in a matter consistent with the scope of this invention.

The invention claimed is:

1. A removable flashlight insert for fitting into an oil-type cigarette lighter outer case; where said flashlight insert has a thin walled outer metal shell of generally rectangular cross-section and formed into an open bottom chamber connected to an open top chamber; wherein said bottom chamber has planar inside surfaces and houses a removable battery module containing one or more batteries; wherein said battery module has a first battery terminal electrically insulated from said inside surfaces and a second battery terminal, of opposite polarity from said first battery terminal, touching one of said inside surfaces; wherein a LED lamp module containing one or more LEDs and a movable switch element is secured inside said top chamber; whereas an insulated electrical conductor assembly is electrically connected from said first battery terminal in said battery module to a first LED terminal in said lamp module, and said metal outer shell is physically and electrically in direct contact to said movable switch element in said lamp module and to said second battery terminal in said battery module; and said movable switch element is electrically connected to a second LED terminal in said lamp module; and said movable switch element is activated by the opening and closing of a hinged lid of said oil-type cigarette lighter outer case when said flashlight insert is installed in said outer case.

2. The removable flashlight insert of claim 1, where said outer metal shell is an oil-type cigarette lighter insert with a wick and a lighter fluid absorbent removed to create said upper chamber connected to said lower chamber; where said upper chamber is a wind guard and said lower chamber is a fuel container of said oil-type cigarette lighter insert.

3. The removable flashlight insert of claim 1, where said outer metal shell is an oil-type cigarette lighter insert with a wick, a lighter fluid absorbent, a flint tube assembly, and a spark wheel removed to create said upper chamber connected to said lower chamber; where said upper chamber is a wind guard and said lower chamber is a fuel container of said oil-type cigarette lighter insert.

4. The removable flashlight insert of claim 1, where a movable cam is attached to an outside extension of said metal shell; and said movable cam is engaged by a hinge element contained inside said hinged lid of said oil-type cigarette lighter outer case.

5. The removable flashlight insert of claim 4, where said movable cam causes said hinged lid of said oil-type cigarette lighter outer case to close; thereby breaking electrical contact between said movable switch element and said outer metal shell to turn off said LEDs in said lamp module.

6. The removable flashlight insert of claim 4, where said movable switch element is a flat "Z" shaped metal cantilever spring with an electrically insulated tip where said spring makes direct contact to said outer metal shell when said lid of said outer case is open, to turn on said LEDs in said lamp module; and said insulated tip of said switch element contacts said hinge element inside said lid when said lid is closed, breaking electrical contact between said spring and said outer metal shell, to turn off said LEDs in said lamp module.

7. The removable flashlight insert of claim 4, where said movable switch element is a part of a toggle mechanism attached to said movable cam; where said switch element makes an electrical connection between said second LED terminal and said outer metal shell when said lid of said outer case is open, to turn on said LEDs in said lamp module; and said switch element does not make an electrical connection between said second LED terminal and said outer shell when said lid of said outer case is closed, to turn off said LEDs in said lamp module.

8. A removable flashlight insert for fitting into an oil-type cigarette lighter outer case; where said flashlight insert has a thin walled outer metal shell of generally rectangular cross-section and formed into an open bottom chamber connected to an open top chamber; wherein said bottom chamber has planar inside surfaces and houses a removable battery module containing one or more batteries; wherein said battery module has a first battery terminal electrically insulated from said inside surfaces and a second battery terminal, of opposite polarity from said first battery terminal, touching one of said inside surfaces; wherein a LED lamp module containing two LEDs, a manually operated LED selector switch for selecting either one of said two LEDs, and a movable switch element are secured inside said top chamber; whereas an insulated electrical conductor assembly is electrically connected from said first battery terminal in said battery module to a first LED terminal in said lamp module, and said metal outer shell is physically and electrically in direct contact to said movable switch element in said lamp module and to said second battery terminal in said battery module; and said movable switch element is electrically connected to a second LED terminal through said selector switch in said lamp module; and said movable switch element is activated by the opening and closing of a hinged lid of said oil-type cigarette lighter outer case when said flashlight insert is installed in said outer case.

9. The removable flashlight insert of claim 8, where said outer metal shell is an oil-type cigarette lighter insert with a wick and a lighter fluid absorbent removed to create said upper chamber connected to said lower chamber; where said upper chamber is a wind guard and said lower chamber is a fuel container of said oil-type cigarette lighter insert.

10. The removable flashlight insert of claim 8, where said outer metal shell is an oil-type cigarette lighter insert with a wick, a lighter fluid absorbent, a flint tube assembly, and a spark wheel removed to create said upper chamber connected to said lower chamber; where said upper chamber is a wind guard and said lower chamber is a fuel container of said oil-type cigarette lighter insert.

11. The removable flashlight insert of claim 8, where a movable cam is attached to an outside extension of said metal shell; and said movable cam is engaged by a hinge element contained inside said hinged lid of said oil-type cigarette lighter outer case.

12. The removable flashlight insert of claim 11, where said movable cam causes said hinged lid of said oil-type cigarette lighter outer case to close; thereby breaking electrical contact between said movable switch element and said outer metal shell to turn off said LEDs in said lamp module.

13. The removable flashlight insert of claim 11, where said movable switch element is a flat "Z" shaped metal cantilever spring with an electrically insulated tip where said spring makes direct contact to said outer metal shell when said lid of said outer case is open, to turn on said LEDs in said lamp module; and said insulated tip of said switch element contacts said hinge element inside said lid when said lid is closed, to break electrical contact between said spring and said outer metal shell, to turn off said LEDs in said lamp module.

14. The removable flashlight insert of claim 11, where said movable switch element is a part of a toggle mechanism attached to said movable cam; where said switch element makes an electrical connection between said second LED terminal and said outer metal shell when said lid of said outer case is open, to turn on said LEDs in said lamp module; and said switch element does not make an electrical connection between said second LED terminal and said outer shell when said lid of said outer case is closed, to turn off said LEDs in said lamp module.

15. A removable flashlight insert for fitting into an oil-type cigarette lighter outer case; wherein said flashlight insert has a thin walled outer metal shell of generally rectangular cross-section and is formed into an open bottom chamber connected to an open top chamber where said bottom chamber has planar inside surfaces; wherein a LED lamp module containing one or more LEDs and a movable switch element is contained inside said top chamber; and an electronic circuit assembly having first and second battery contacts, a battery charging means, and a battery charging port connected to said battery charging means, is secured in said bottom chamber; and a rechargeable battery, having first and second battery terminals connected to said first and second battery contacts respectively, is included with said electronic circuit assembly; whereas an insulated electrical conductor assembly makes an electrical connection from a first LED terminal contained in said lamp module to said first battery contact; and said metal outer shell makes direct physical and electrical contact to said second battery contact and to said switch element; and said switch element is electrically connected to a second LED terminal in said lamp module; and said movable switch element is activated by the opening and closing of a hinged lid of said oil-type cigarette lighter outer case when said flashlight insert is installed in said outer case; and where said battery charging port is available to an outside power source for charging said rechargeable battery.

16. The removable flashlight insert of claim 15, where said outer metal shell is an oil-type cigarette lighter insert with a wick and a lighter fluid absorbent removed to create said upper chamber connected to said lower chamber; where said upper chamber is a wind guard and said lower chamber is a fuel container of said oil-type cigarette lighter insert.

17. The removable flashlight insert of claim 15, where said outer metal shell is an oil-type cigarette lighter insert with a wick, a lighter fluid absorbent, a flint tube assembly, and a spark wheel removed to create said upper chamber connected to said lower chamber; where said upper chamber is a wind guard and said lower chamber is a fuel container of said oil-type cigarette lighter insert.

18. The removable flashlight insert of claim 15, where a movable cam is attached to an outside extension of said metal shell; and said movable cam is engaged by a hinge element contained inside said hinged lid of said oil-type cigarette lighter outer case.

19. The removable flashlight insert of claim 18, where said movable cam causes said hinged lid of said oil-type cigarette lighter outer case to close; thereby breaking electrical contact between said movable switch element and said outer metal shell to turn off said LEDs in said lamp module.

20. The removable flashlight insert of claim 18, where said movable switch element is a flat "Z" shaped metal cantilever spring with an electrically insulated tip where said spring makes direct contact to said outer metal shell when said lid of said outer case is open, to turn on said LEDs in said lamp module; and said insulated tip of said switch element contacts said hinge element inside said lid when said lid is closed, to break electrical contact between said spring and said outer metal shell, to turn off said LEDs in said lamp module.

21. The removable flashlight insert of claim 18, where said movable switch element is a part of a toggle mechanism attached to said movable cam; where said switch element makes an electrical connection between said second LED terminal and said outer metal shell when said lid of said outer case is open, turning on said LEDs in said lamp module; and said switch element does not make an electrical connection between said second LED terminal and said outer metal shell when said lid of said outer case is closed, turning off said LEDs in said lamp module.

22. A kit for converting an oil-type cigarette lighter insert into a flashlight insert; where said kit consists of a lamp module containing one or more LEDs and a movable switch element, and a battery module electrically insulated on one side and containing one or more batteries; whereby said lamp module has a first terminal of said LED connected to an insulated wire and a second terminal of said LED connected to said movable switch element; wherein said lamp module is an electronic circuit assembly connected to said LEDs, said switch element, and said insulated wire; whereby said electronic circuit assembly has means for detecting a spark generated by a spark wheel assembly attached to said flashlight insert: where said spark causes said electronic circuit assembly to turn on said LEDs; and said LEDs remain on until said switch element is activated to turn off said LEDs.

23. A method for converting an oil-type cigarette lighter insert into a flashlight insert; consisting of the steps of: removing a wick and a lighter fluid absorbent from said oil-type cigarette lighter insert to create an empty wind guard and an empty fuel container; installing a lamp module, containing one or more LEDs and a switch element, inside said wind guard, wherein said lamp module contains only one insulated wire that is guided through a wick hole into said empty fuel container during the said assembly; installing a battery module by first connecting said insulated wire to an insulated connector in a battery holder having only one side insulated; and then installing one or more batteries into the said battery holder, exposing one un-insulated battery terminal, to complete the said battery module; and then sliding said battery module into said empty fuel container, whereby said un-insulated battery terminal of said batteries makes direct physical and electrical contact with the inside surface of said empty fuel container.

\* \* \* \* \*